Patented Apr. 8, 1952

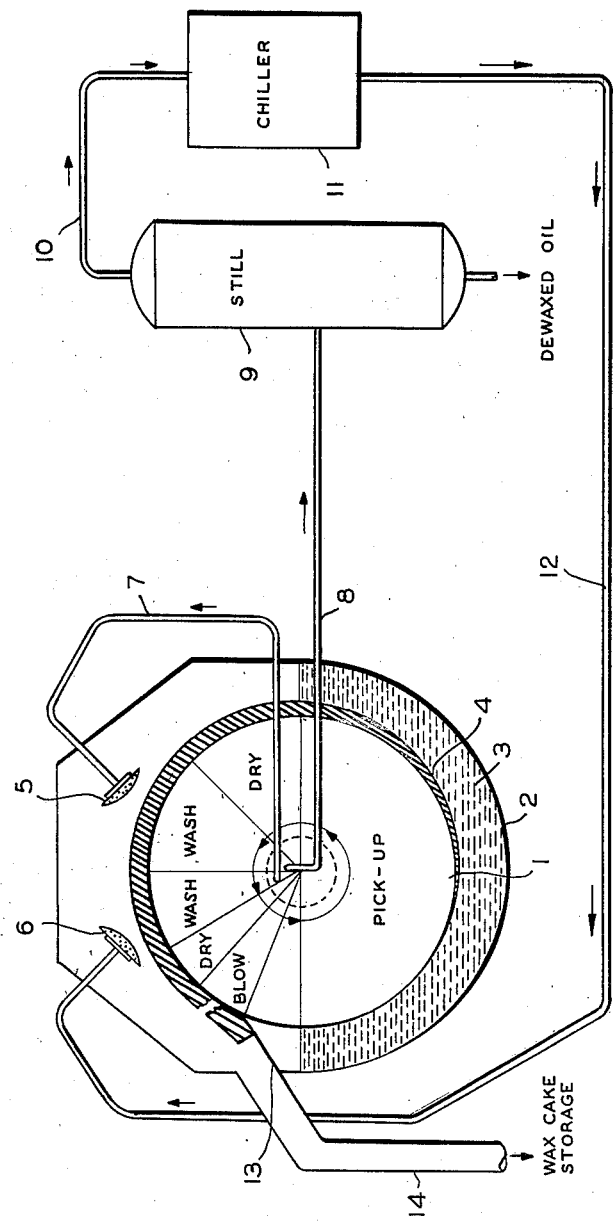

2,592,490

UNITED STATES PATENT OFFICE 2,592,490

METHOD OF DEWAXING OIL AND CONTINUOUS ROTARY FILTER THEREFOR

James P. Thompson, Beaumont, Tex., assignor to Socony-Vacuum Oil Company, Incorporated, New York, N. Y., a corporation of New York Application November 29, 1949, Serial No. 129,936

6 Claims. (Cl. 196—19)

This invention relates to an improvement in the apparatus and operation of continuous rotary filters used in separation of wax from a chilled slurry containing crystallized wax, oil, and a dewaxing solvent.

A solvent dewaxing process for the removal of wax from petroleum fractions comprises the steps of adding a solvent to the waxy oil, chilling the mixture to precipitate wax therefrom and separating the wax from the mixture by filtration. The particular solvent employed may be a diluent to decrease the viscosity of the oil or a material or mixture of materials in which the oil is substantially completely soluble and the wax substantially completely insoluble at the dewaxing temperature. Embraced within the term solvent are light petroleum hydrocarbons, such as propane and its homologues, alcohols, ketones, aldehydes, cyclic hydrocarbons, toluene, benzene and its homologues, or other appropriate organic liquids. One solvent commonly used is a mixture of benzene and methyl ethyl ketone.

A rotary filter of the type generally employed for separation of the precipitated wax comprises a hollow rotating cylinder covered with a suitable filter fabric and furnished with means for creating vacuum within the interior of the cylinder. During operation, the rotating cylinder is kept partially submerged in the cold filtering mixture of precipitated wax, oil, and solvent. Wax is deposited on the submerged portion of the surface to form a cake while liquid flows through the surface into the interior of the cylinder from which it is withdrawn as filtrate. As the cylinder rotates, the cake is exposed, whereupon it may be dried and washed by spraying solvent liquid on to the surface of the cake, the liquid being drawn through the cake into the interior of the cylinder for removal. The cake may be subjected to further drying to remove remaining wash liquid, following which the cake is removed, usually by the application of slight reverse pressure to the interior of the filtering element, causing distention of the fabric and consequent loosening of the cake, complete removal of which is facilitated by scraping means located adjacent to the exterior surface of the filter fabric.

Washing of the wax cake with a suitable solvent during rotation is necessary to remove a major portion of the oil adhering thereto. The wash solvent employed is generally the same solvent used in dewaxing. In some instances, a wash solvent of different nature than the dewaxing solvent may be employed. Thus, in one form of solvent dewaxing in which liquified propane is used as the dewaxing solvent, it has been found desirable to employ a wash solvent of liquid butane. When the term wash solvent is used herein, all such modifications are contemplated.

It has heretofore been the practice to apply a cold solvent wash to the rotating wax cake through an arrangement of sprays and weirs positioned above the liquid level in the filter. The resulting filtrate, composed of solvent and oil dissolved from the wax cake, was thereafter drawn off through an axial conduit, distilled and the overhead solvent fraction refrigerated for re-use. Under such conditions of operation, it was necessary to use a considerable quantity of wash solvent to free the wax cake of substantially all adhering oil. Moreover, as the thickness of the wax cake increased, the amount of wash solvent necessary likewise had to be increased. The excessive amount of wash solvent employed placed a heavy burden on distillation and refrigeration equipment, entailing the need for respective prolonged heating and chilling, thereby rendering the overall process expensive and time-consuming. It has previously been suggested that the vacuum on the filter in the pickup zone might be decreased so that thinner cakes would be obtained which could be more effectively sprayed in the washing part of the cycle with comparatively less solvent and hence the load on the distillation and refrigeration equipment thereby reduced. However, this suggested method has the disadvantage of lowering the filtration rate, thus reducing the capacity of the filter.

It is an object of the present invention to provide an improved filtering process for dewaxing wax-bearing oils. A further object is to improve the efficiency of oil removal from wax cake with a given amount of wash solvent. A still further object is the provision of an improved dewaxing method and apparatus therefor. Another object is to dewax waxy oils continuously and to provide a wash system affording economy in the use of wash solvent. These and other objects will be apparent from the following description of the invention.

In accordance with the present invention, operation of the continuous rotary filter is arranged so that freshly distilled solvent is first used in sprays positioned above the traveling wax cake at a point remote from the emersion of the wax cake from the oily feed slurry. These sprays are generally arranged on the descending side of the rotary filter. The filtrate obtained from washing of the wax cake through said sprays is then collected and returned to sprays positioned above the traveling wax cake at a point adjacent to the emersion of the wax cake from the oily feed slurry. These sprays are generally arranged on the ascending side of the rotary filter. The second filtrate of oil and solvent resulting from a washing of the wax cake through these sprays is then separated into its components by distillation. Dewaxed oil is obtained as a bottoms product while the solvent passes overhead during distillation. The solvent so recovered is thereafter chilled in the usual manner and recycled to sprays remote from the point of emersion of the wax cake from the feed slurry. The washed filter cake is thereafter dried and removed from the filter with a scraper or other suitable means. Upon carrying out operation in accordance with this procedure, an improved efficiency of oil removal from the wax cake is effected by affording an increased quantity of cold solvent wash for a given capacity in distillation and refrigeration equipment.

In order to better understand the invention, reference will now be made to the accompanying drawing forming a part of this specification, which illustrates a preferred embodiment of the invention.

Referring to the drawing, 1 denotes a rotary filtering drum, the cylindrical surface of which is covered with a filtering medium formed from cloth, metal fabric or other suitable porous filtering material. The drum rotates counter-clockwise within a housing 2. The lower portion of the housing is filled with a feed slurry 3, comprising a mixture of precipitated wax, oil and solvent. As the drum revolves, the filter surface passing through the feed slurry picks up a wax cake, indicated by 4. As the wax cake emerges from the slurry, it is subjected to a drying period and is then sprayed with a wash liquid applied through spray 5. This wash liquid is the filtrate resulting from initial contact of solvent with the wax cake. The solvent is applied through spray 6 on the descending side of the filter. The mixture of solvent and oil obtained as a filtrate from this initial contact is then collected and returned through pipe 7 to spray 5. The second filtrate liquid resulting from the wash, applied through spray 5, is thereafter drawn off through pipe 8 and conducted to still 9, from which dewaxed oil is removed as a bottoms product, while the solvent passes overhead through conduit 10 to chiller 11, where it is refrigerated and then recycled through pipe 12 to spray 6.

After being washed, the wax cake is subjected to a further drying period and pressure is applied to the cake from within the drum, causing it to lift and break therefrom. The broken cake is then removed from the drum with the aid of scraper blade 13 and is led down through 14 to storage. The sequence of these various operations is indicated by appropriately labeled sections on the drum in the drawing. It is to be understood, however, that the arrangement of these operations and their appropriate duration may be varied widely according to the local operating conditions.

I claim:

1. The method of removing wax from an oily feed slurry in a closed continuous filter, which comprises the steps of forming a wax filter cake upon a traveling surface within the filter chamber, drying said cake as it emerges from the feed slurry, spraying the dried cake with a wash liquid prepared as hereinafter described, subjecting the cake to a secondary spraying with freshly distilled solvent, recycling the oil-solvent filtrate obtained as a result of said secondary spraying for use as the aforesaid initial wash liquid, distilling the oil-solvent filtrate obtained from initial spraying of the wax cake, chilling the resulting overhead solvent product and recycling the same for use in the secondary spray operation, thereafter drying the washed filter cake, dislodging said cake by blowing gas therethrough and removing said dislodged cake from the filter surface.

2. The method of operating an enclosed rotary drum filter for removal of oil from wax, wherein a filter cake is formed upon the drum surface while submerged in a feed slurry, comprising spraying the cake after emersion with an oil-solvent wash liquid prepared as hereinafter described, secondarily spraying the cake with freshly distilled solvent, collecting the oil-solvent filtrate resulting from said secondary spraying, recycling said filtrate for use as the aforesaid initial wash liquid, distilling the oil-solvent filtrate resulting from said initial spraying into its components of oil and solvent, recycling the latter for use in the secondary spray operation and thereafter drying and removing the washed wax cake from the filter surface.

3. The method of operating an enclosed rotary drum filter for removal of oil from wax, wherein a filter cake is formed upon the drum surface while submerged in a feed slurry, comprising spraying the cake after emersion with an oil-solvent wash liquid prepared as hereinafter described, secondarily spraying the cake with freshly distilled solvent, collecting the oil-solvent filtrate resulting from said secondary spraying, recycling said filtrate for use as the aforesaid initial wash liquid, conducting the oil-solvent filtrate resulting from said initial spraying to a fractionating column, distilling said oil-solvent filtrate to yield a bottoms product of dewaxed oil and an overhead product of solvent, chilling the overhead solvent product, recycling the chilled solvent for use as the secondary spray fluid and thereafter drying and removing the washed wax cake from the filter surface.

4. Apparatus for continuous dewaxing of a wax-bearing mineral oil, comprising, in combination, a continuous rotary filter including a rotatable filter drum supporting a continuous filtering element, a housing enclosing said drum, means for continuously drying the wax cake on the filtering element, spray devices adjacent to said drying means for continuously washing the dried cake, spray devices remote from said drying means for continuously washing the cake, means for conducting filtrate liquid obtained upon spraying the wax cake through spray devices remote from said drying means to spray devices adjacent to said drying means, means for distilling the filtrate liquid obtained upon spraying the wax cake through spray devices adjacent to said drying means, means for chilling wash liquid resulting from said distillation, means for conducting said chilled wash liquid to spray devices remote from said drying means, means for continuously drying the washed cake, means for dislodging the cake from the filtering element by blowing gas therethrough and means for removing said dislodged cake from said filtering element.

5. Apparatus for continuous filtration, comprising a drum mounted for rotation about a horizontal axis, a reservoir about the lower portion of said drum to maintain a feed slurry in contact therewith, means to wash a filter cake on the upper surface of said drum involving a series of spray devices positioned adjacent to and remote from the point of emersion of said filter cake from said feed slurry, means for collecting filtrate resulting from spraying the filter cake through said remote spray devices, means for conducting said filtrate to said adjacent spray devices, means for collecting filtrate resulting from spraying the filter cake through said adjacent spray devices, means for separating said collected filtrate into its components, means for recycling the washing component of said separated filtrate to spray devices remote from said point of emersion, means for drying and removing the washed filter cake from said drum.

6. Apparatus for continuous dewaxing of a wax-bearing mineral oil, comprising, in combination, a continuous rotary filter including a rotatable filter drum supporting a continuous filtering element, a housing enclosing said drum, means for continuously drying the wax cake on the filtering element, spray device for continuously washing the cake on the filtering element as the latter ascends, spray device for continuously washing the cake on the filtering element as the latter descends, means for conducting filtrate liquid obtained from washing the descending cake to spray device for washing the ascending cake, means for collecting filtrate liquid obtained from washing the ascending cake, means for effecting distillation of said collected filtrate, means for chilling solvent overhead resulting from said distillation, means for conducting chilled solvent to spray device for washing the cake on the filtering element as the latter descends, means for continuously drying the washed cake, means for dislodging the cake from the filtering element by blowing gas therethrough, and means for removing said dislodged cake from said filtering element.

JAMES P. THOMPSON.

REFERENCES CITED

The following references are of record in the file of this patent:

UNITED STATES PATENTS

| Number | Name | Date |
|---|---|---|
| 1,998,747 | Adams | Apr. 23, 1935 |
| 2,005,984 | Adams et al. | June 25, 1935 |
| 2,040,056 | Manley | May 5, 1936 |
| 2,119,749 | Merrill | June 7, 1938 |
| 2,166,891 | Gee | July 18, 1939 |
| 2,268,788 | Wanner et al. | Jan. 6, 1942 |